April 18, 1944.     L. J. DE LANTY     2,346,830
TUBE TESTER
Filed Oct. 10, 1940
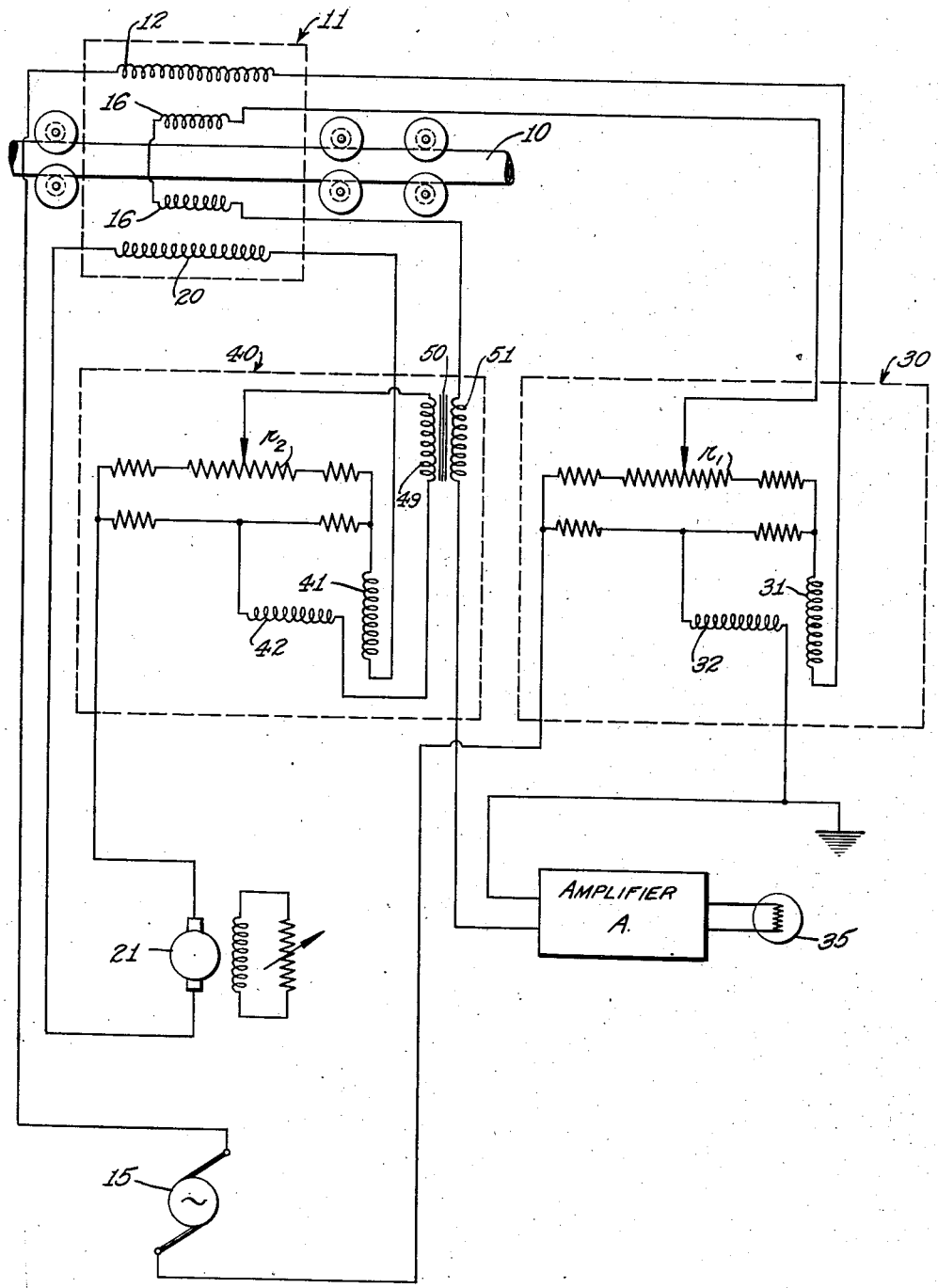
INVENTOR
LOREN J. DE LANTY
BY
Joseph H. Lipschutz
ATTORNEY Patented Apr. 18, 1944

2,346,830

UNITED STATES PATENT OFFICE 2,346,830

TUBE TESTER

Loren J. De Lanty, Spring Valley, N. Y., assignor to Sperry Products, Inc., Hoboken, N. J., a corporation of New York Application October 10, 1940, Serial No. 360,563

1 Claim. (Cl. 175—183)

This invention relates to testing devices for metallic articles such as tubes, bars and the like. More particularly it relates to the type of testing device disclosed in the patent to Horace C. Knerr and Cecil Farrow, Reissue No. 21,003, dated Feb. 14, 1939. In said patent there is disclosed the method of testing metallic articles, such as tubes, for flaws, which consists in energizing the tube with flux from an A. C. source and detecting variations in the counter-flux set up within the wall of the tube and caused by the presence of defects which it is desired to locate. In applying this method to magnetizable material it was found that the variations in the magnetic properties of the tube were so great as to obliterate those variations caused by internal defects. In order, therefore, that these magnetic variations in the properties of the material shall not affect the detection of actual defects, the said Knerr and Farrow disclosed the feature of saturating the magnetic material of which the tube is composed with flux from a D. C. source. While such source may be provided by batteries, as disclosed in said patent, it has been found that in practice, particularly in testing large diameter tubes, batteries are impractical and it is desirable to obtain the saturation flux from a source such as a D. C. generator. However, it is one of the characteristics of such generator that in addition to the D. C. current which is generated there is also produced an A. C. or a pulsating component in the form of a ripple of a definite cycle. This ripple produces counter-flux in the article which then affects the detection coils unevenly because it is not practical to have these coils exactly match, and this produces an output which after being amplified is of a nature such as to interfere with the output caused by an actual internal defect.

It is therefore the principal object of this invention to provide in a system of flaw detection of the type mentioned above, means whereby the D. C. ripple produced by a D. C. generator connected to the saturation coil will be substantially nullified so that it will have substantially no effect on the output of the detection device.

Further objects and advantages of this invention will become apparent in the following detailed description thereof.

In the accompanying drawing, the single figure illustrates diagrammatically the method of flaw detection having my invention embodied therein.

Referring to the drawing, my invention is disclosed as applied to the testing of tubes correspondingly to the disclosure in the above named Knerr and Farrow patent Reissue No. 21,003. It will be understood, however, that the invention is not limited to the testing of tubes but has application to other metallic articles. A tube 10 is passed through a testing device 11 which comprises an A. C. exciting coil 12 for producing flux within the tube walls. The source of said A. C. excitation may be an A. C. generator 15 which may supply any type of A. C. current desired. Thus, for instance, for certain types of tubes a 400 to 450 cycle current may be employed. The flux induced in the walls of the tube results in a counter-flux which is normally uniform except in the region of flaw, wherein a different counter-flux will be generated, and this variation in flux caused by the presence of a defect may be detected by means of one or more detector coils 16 positioned circumferentially of the tube. Two coils 16 are here employed, oppositely connected so that variations in current supply will be largely wiped out. However, the coils 16 in practice are not exactly balanced, and therefore variations in A. C. supply will produce some variation in output which is compensated for in the manner described hereinafter.

In order that variations in the magnetic property of the material itself shall not affect the result, a D. C. saturation coil 20 is employed whose function it is to substantially saturate the walls of the tube in the testing position with D. C. flux. When so saturated, the variations in magnetic property of the tube material will have no effect upon the testing result. The saturating coil 20 may be supplied with D. C. from a continuous generating source such as D. C. generator 21.

The A. C. exciting coil 12 produces, as hereinbefore stated, a certain number of cycles of current variation per second. The detector coils 16, being oppositely connected, would ordinarily wipe out any cyclical variations, so that the output from said coils leading to the amplifier A would normally be zero except for a small unbalance wave caused by the fact that coils 16 cannot be made of exactly the same inductance. However, it has been found that the output of coils 16 when they encounter a region of defect within the tube 10 is more effective if superimposed upon a predetermined wave form. In order that said wave form may be predetermined to give the most satisfactory output, there is employed in connection with the output of coils 16 a phase and amplitude adjusting network, indicated generally at 30, which may be of known design. The A. C. ripple which is produced by coils 16 in response to the A. C. excitation may be given any desired amplitude by varying the relative positioning of coils 31 and 32 which are in inductive relation and comprise the parts of a variometer. The phase position of the output may be controlled by means of resistor $r_1$. The net result is that the normal output of coils 16 is a wave form of predetermined amplitude and phase position. This amplitude and phase is such that the best results are obtained when coils 16 encounter a region of flaw and the output caused by said region is superimposed upon the normal wave form. A defect appearing in the wall of the tube adjacent to one coil 16 will affect this detector coil 16 more than the other coil 16 to generate an impulse which is superimposed on the normal output of coils 16. The total output enters amplifier A and may then be caused to operate any suitable indicator such as a light 35 or a recording mechanism.

The output which is superimposed on the normal wave form when coils 16 encounter a region of small flaw within the tube 10 would be obscured by the D. C. ripple set up in the said coils 16 by the D. C. generator 21 in the normal functioning of said generator supplying direct current to the saturating coil 20. In order that this D. C. ripple shall not obscure the output of coils 16 and therefore reduce their effectiveness as flaw detecting means, an amplitude and phase adjusting network 40, substantially similar to the one shown at 30, may be employed. In this case the saturating coil 20 is connected to the variometer 41, 42 which may be varied to produce a wave form and amplitude substantially equal and opposite to the amplitude of the wave form produced in coils 16 by the D. C. ripple. Similarly, the phase of the wave may be adjusted by resistance $r_2$ so that there is produced a wave equal in amplitude and opposite in phase to the D. C. ripple produced in coils 16. The output of amplitude and phase adjusting network 40 may act oppositely to the output caused by the ripple in coils 16 by connecting the network 40 to one coil 49 of a suitable transformer 50, the other coil 51 of which is connected to the coils 16.

Thus the output of coils 16 on its way to the amplifier A is deprived of the D. C. ripple by the action of the cancellation network 40.

It will thus be seen that in the system of detection described above, a D. C. generator may be employed for the purpose of supplying direct current to the saturating coil 20 without causing the D. C. ripple to be superimposed on the normal wave form caused by the A. C. exciter coil, and therefore without obscuring the variations in said wave form which would be caused when coils 16 encounter a defect in the wall of tube 10.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

In a device for testing metal articles for defects, means for energizing the article with flux from an A. C. source, means including a D. C. generator for saturating the article with D. C. flux, means responsive to variations in flux within said article, said responsive means generating a wave form in response to variations in flux caused by a defect within said article, said D. C. generator normally generating variations in flux similar to those generated by a defect in the article, and means for nullifying the effect of said last named variations, said last named means comprising an amplitude and phase controlling means, said D. C. generator being connected to the input of said controlling means, and means whereby the output of said controlling means is opposed to the output from said responsive means.

LOREN J. DE LANTY.